Sept. 19, 1961  C. A. TAYLOR  3,000,225
ROTARY DRILL HEADS
Filed Sept. 29, 1958  2 Sheets-Sheet 1
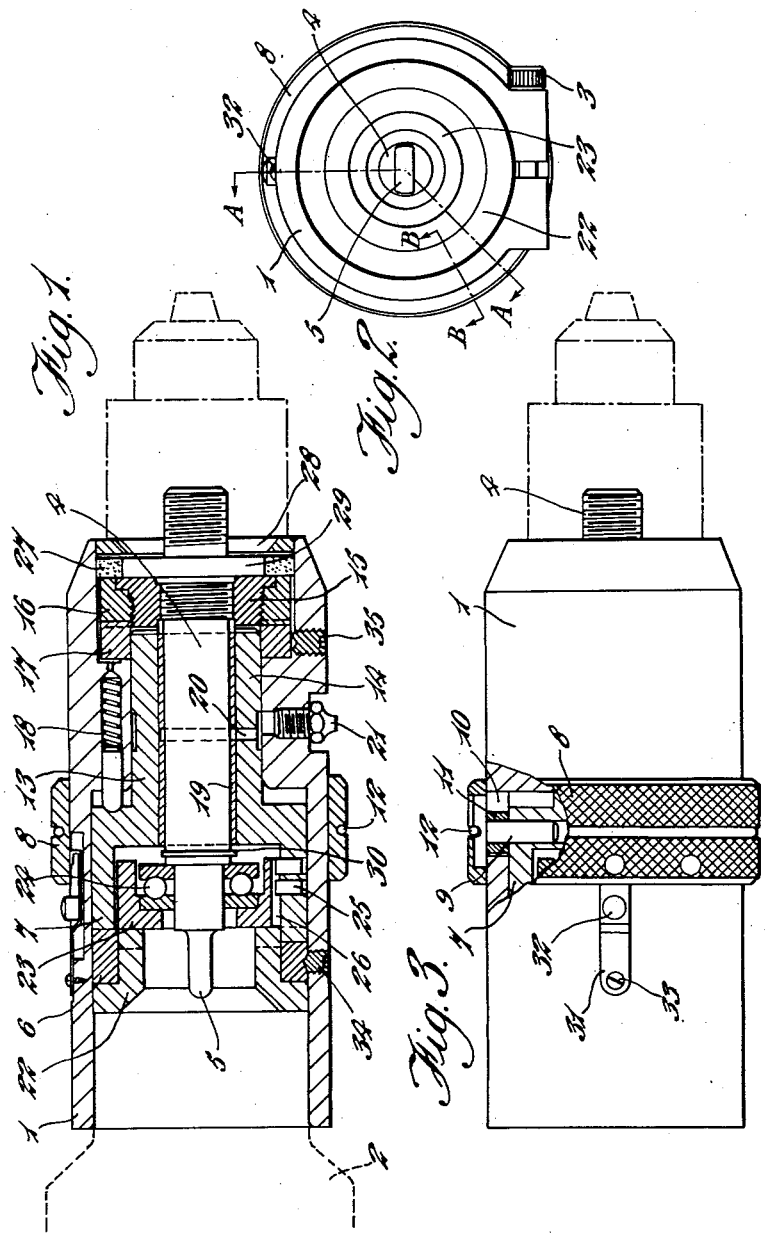
Inventor
Cecil Arthur Taylor
by Stevens, Davis, Miller & Mosher
his attorneys

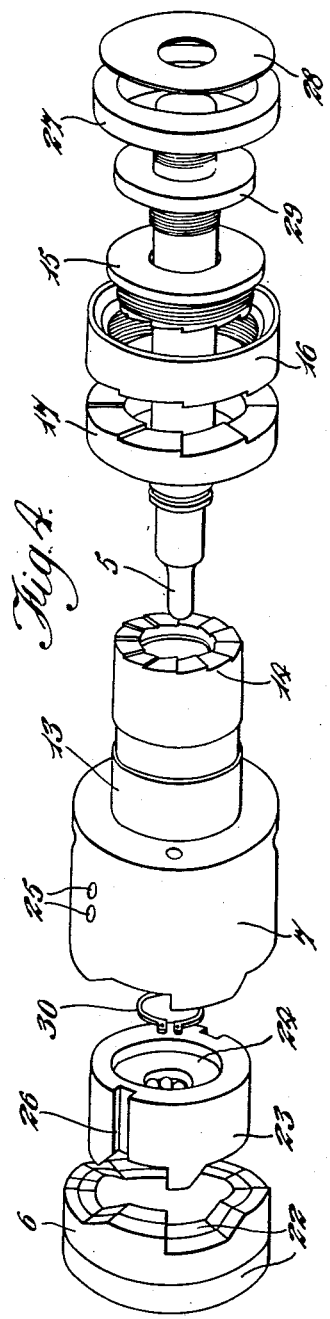

United States Patent Office 3,000,225
Patented Sept. 19, 1961

3,000,225
ROTARY DRILL HEADS
Cecil Arthur Taylor, London, England, assignor to The Rawlplug Company Limited, London, England
Filed Sept. 29, 1958, Ser. No. 764,180
Claims priority, application Great Britain Nov. 26, 1957
6 Claims. (Cl. 74—22)

The present invention concerns rotary drills and in particular a drill head for an electric drill.

A principal object of the present invention is to provide a drill head for use in the drilling of hard masonry, concrete, stone, or the like by a combined rotary and vibratory action and in which it is possible to select vibrations of different character, e.g. for drilling large holes, a coarse relatively slow vibration and, for drilling small holes, a fine fast vibration. An additional object is to provide such a drill head which, for drilling holes in softer material such as wood, plaster or the like, is also adapted for use as a simple non-vibratory drill. Other objects of the invention will appear from the following description and appended claims.

One embodiment of the invention resides in a drill head for a rotary drill which comprises a casing; a shaft mounted in the casing and capable of simultaneous rotational and axial movement, the shaft being adapted at one end to be connected to the power source and at the other end to a chuck; vibratory means capable of imparting to the shaft during rotation thereof, any one of at least two axial vibrational movements of different predetermined frequency and preferably of different amplitude also; and means for selectively bringing into operation any one of said vibrational movements.

A particularly preferred embodiment of the invention resides in a drill head capable of imparting to the bit two vibrations of different predetermined character, one vibration being relatively fast and fine and the other being relatively slow and coarse. It has been found that fast fine vibrations are essential when drilling small holes up to about $7/_{32}$ of an inch and slow coarse vibrations are advantageous when drilling larger holes and when drilling concrete made up with large aggregate and also very hard brick. A drill head according to this preferred embodiment has a very wide range of uses and may even be used for drilling holes in thin delicate glazed tiles.

Preferably the axial vibration of the shaft is achieved by at least two sets of cam surfaces engageable during rotation of the shaft to impart vibrations of a predetermined character thereto. In the preferred construction of the drill head according to the invention there are provided two such sets of cam surfaces, one set capable of imparting to the shaft a relatively rapid axial vibration and the other set capable of imparting a relatively slow axial vibration.

Each set of cam surfaces is preferably coaxial with the shaft and comprises a face cam having a serrated face mounted on the shaft, hereinafter referred to as a rotary vibrator, and a complementary face cam mounted in the casing, hereinafter referred to as a stationary vibrator. As the shaft rotates the serrations of the rotary vibrator ride over the serrations of stationary vibrator thereby causing the shaft to vibrate axially. By providing each set of cam surfaces with serrations of a different spacing, vibrations of different frequency are provided for and also a difference in the depth of the serrations from one set to another provides for vibrations of different amplitude.

In the preferred construction the means for controlling, at will, the character of the vibrations comprises a pair of complementary face cams, referred to hereinafter as selector face cams, coaxial with the shaft, one selector face cam being fixed in the casing and the other being manually operable as by an index sleeve located externally of the casing and connected thereto, to permit, at will, the operative engagement of one but not both sets of engageable cam surfaces.

In accordance with a further aspect of the present invention, there is provided, in a drill head as above described, additional means to render, at will, the vibratory means inoperative to permit a single rotation of the shaft free of axial vibration. A drill head according to this latter aspect is therefore adaptable for use as a vibratory drill capable of at least two axial vibrational movements of different predetermined character operable at will and, also, as a non-vibratory rotary drill.

The invention will be further described with reference to the accompanying drawings, in which:

FIG. 1 is a section along A—A of FIG. 2, which is an end elevation of a preferred construction of a drill head according to the invention;

FIG. 3 is a part section along B—B of FIG. 2;

FIG. 4 is a perspective view of certain parts of the drill head of FIG. 1 in an exploded relationship.

Referring to the drawings, the drill head comprises a vibrator casing 1 detachably secured to a power source, such as a rotary electric drill motor and gear box unit 2, shown by broken lines in FIG. 1, by means of clamp screw 3. The vibrator casing 1 forms a housing for the vibrator means and the selector mechanism. A vibrator shaft 4, shown in elevation in FIG. 1, is coaxially mounted within the casing 1 so as to be capable of simultaneous rotational and axial movement and has at one end a tongue 5 adapted to engage with a corresponding slot in the end of the driving shaft of the power source motor. At the end remote from the drill, the shaft 4 is adapted to be secured to a chuck, of conventional construction, illustrated in FIGS. 1 and 3 by broken lines, in which a drill bit may be fitted in the usual manner.

A fixed selector face cam 6 is pinned inside the vibrator casing by grub screw 34 and is adapted to engage with a movable selector face cam 7 secured to an index sleeve 8 which is arranged on the outer surface of the vibrator casing. The movable selector cam 7 is secured to the sleeve 8 by means of a pin 9 extending through a slot 10 in the vibrator casing from which it is separated by a roller 11, and into the movable selector cam 7. The pin 9, is secured in position by a circlip 12 about the sleeve 8.

As will be more clearly seen from FIG. 4, the movable selector cam 7 has a coaxial extension 13 provided with a serrated face, at its end remote from the cam, which constitutes a normally stationary fine vibrator face cam 14. In one position of the index sleeve, this stationary fine vibrator face cam is adapted to engage a rotary fine vibrator face cam 15 having a correspondingly serrated face cam and which is mounted on the shaft 4. An annular rotary coarse vibrator face cam 16 is secured to the outer periphery of the rotary fine vibrator 15, and, in the position of the index sleeve as illustrated in FIG. 1, engages a correspondingly serrated fixed coase vibrator face cam 17 pinned, by means of a grub screw 35, to the vibrator casing 1. As will be seen from FIG. 4, the coarse vibrator cams 16 and 17 have fewer and larger teeth than the fine vibrator cams 14 and 15.

The fixed coarse vibrator cam 17 is so mounted about the outer periphery of the normally stationary fine vibrator cam 14 that this latter can slide axially therewithin upon operation of the index sleeve.

The combined member comprising the normally stationary fine vibrator cam 14 and movable selector cam 7, is spring-loaded by means of a compression spring 18 engaging between the movable selector cam 7 and the vibrator casing 1 and serving to maintain the engagement of selector cams 6 and 7 at all times. The combined member 7 and 14 has an axial bore through which the shaft 4 is adapted to pass, separated therefrom by a liner 19. A grease channel 20 is provided extending from a grease nipple 21 mounted in the casing to the shaft 4 for purposes of lubricating the shaft.

An inner fixed selector cam 22 is provided axially mounted within the fixed selector cam 6 and is adapted to engage with an inner movable selector cam 23 axially positioned within movable selector cam 7. The inner movable selector cam 23 is a floating cam axially positioned on the shaft 4 but separated therefrom by a thrust race 24. A loose connection is provided between selector cam 7 and selector cam 23 in the form of guide pins 25 extending from the internal wall of the selector cam 7 slidably engaging with a key way 26 provided in the periphery of the selector cam 23. In a further position of the index sleeve 8, the inner movable selector cam 23, by engagement with the inner fixed selector cam 22, is adapted to operate against the thrust race 24 to move the shaft 4 laterally to disengage both the fine vibrator cams 14 and 15 and the coarse vibrator cams 16 and 17. In this position of the index sleeve the drill head is adapted to transmit from the power source to the chuck a simple rotational motion for straightforward drilling.

A felt washer and retaining plate therefor, 27 and 28 respectively, are mounted on the end of the shaft 4 adjacent the chuck and fitting within the end of the casing 1 to prevent dust and dirt from entering the vibrator casing. The felt washer 27 is annularly mounted on a coaxial flange 29 integrally formed on the shaft 4.

The shaft 4 is capable of limited axial movement within the casing 1 but is secured from complete withdrawal by a circlip 30 thereabouts which is adapted to abut against the end of the axial bore provided in the combined member 7 and 14. The extent of this axial movement is however sufficient to disengage both the vibrator units. It is, therefore, the case that, when a drill fitted with a drill head according to the invention is operating under no load, and when held vertically with the drill head pointing downwards the vibrator cams are disengaged by gravity acting upon the shaft 4 which, in such position, is hanging upon the circlip 30. Thus when using the drill as a vibratory drill, no vibrations are transmitted to the bit until a drilling pressure is applied. It will be realised therefore that, while the amplitude and frequency of the vibrations imparted to the bit can be preselected, the actual percussive force is controlled by the drilling pressure applied to the bit.

The index sleeve 8 is provided with a spring latch 31, to secure the sleeve in its respective positions. The spring latch 31 is secured to the external surface of the casing 1 by a screw 33 and is operable by a button 32 to disengage the sleeve so that the sleeve can be rotated to operate the selector mechanism.

Referring now to the operation of the drill head and considering firstly the position of the index sleeve 8 shown in FIG. 1, the drill head is adapted to impart to the bit a slow coarse vibration by virtue of the engagement of coarse vibrator cams 16 and 17 subject to the application of a drilling pressure as above described. Upon disengagement of the latch 31 the index sleeve may be rotated to bring into an operative position the fine vibrator cams 14 and 15. As the sleeve is rotated the movable selector cam 7 pinned thereto operates against the fixed selector cam 6 to slide the normally stationary fine vibrator cam 14 to engage the rotary fine vibrator cam 15 and to displace the shaft 4 laterally to a small extent to disengage the coarse vibrator cams 16 and 17. In this position of the sleeve the drill head is adapted to provide a fast fine vibration of the bit upon application of drilling pressure thereto.

In addition to causing lateral movement of the member 14, the rotation of the movable selector cam 7 also rotates the inner movable selector cam 23 to bring the cam surfaces thereon into contact with the cam surfaces of the inner fixed selector cam 22. Upon further rotation of the sleeve to a third position the inner movable selector cam 23 rotates with the movable selector cam 7 and operates against the inner fixed selector cam 22, through the thrust race 24 to slide the shaft 4 laterally to disengage both the fine and coarse vibrator members. Thus, in this third position of the index sleeve the drill head is adapted to transmit a simple drilling rotation to the bit.

Though the invention has been described with specific reference to a drill head adapted to impart to the bit either one of two different predetermined rates of vibration and also adapted to be used as a simple rotary drill it will be realised that, with suitable constructional modification the drill head may be adapted to impart a greater or smaller range of vibrations. For example, there may be provided only one vibrator unit and means for disengaging that unit, at will, so that the drill head can be used simply as a vibratory drill or a rotational drill.

Furthermore, though the drill head has been described as detachable from the drill motor, it will be realised that the drill head may form an integral part of the drill and the casing of the head formed integrally with the drill casing. This will be possible particularly in the case where the drill head is adapted for straightforward drilling as well as vibratory drilling.

I claim:

1. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; means for imparting to the shaft during rotation reciprocations of one frequency; means for imparting to the shaft during rotation reciprocations of another frequency; and means for selectively engaging either of said reciprocation imparting means whereby, during rotation, reciprocations of either frequency may be imparted to the shaft.

2. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; a first pair of engageable face cams including a face cam axially secured on the shaft and a face cam non-rotatably mounted with the casing coaxial with the shaft to impart to the shaft during rotation reciprocations of one frequency; a second pair of engageable face cams including a face cam axially secured on the shaft and a face cam non-rotatably mounted within the casing coaxial with the shaft to impart to the shaft during rotation reciprocations of another frequency; and means for selectively engaging either of the pairs of face cams whereby, during rotation, reciprocations of either frequency may be imparted to the shaft.

3. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; a first pair of engageable face cams including a face cam axially secured on the shaft and a face cam non-rotatably mounted with the casing coaxial with the shaft to impart to the shaft during rotation reciprocations of one frequency; a second pair of engageable face cams including a face cam axially secured on the shaft and a face cam non-rotatably mounted within the casing coaxial with the shaft to impart to the shaft during rotation reciprocations of another frequency, one of said non-rotatable face cams being slidable by means of a manually operable selector cam connected thereto, to effect the operative engagement of either one of the pairs of face cams while simultaneously rendering the other pair inoperative.

4. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; means for imparting to the shaft during rotation reciprocations of one frequency; means for imparting to the shaft during rotation reciprocations of another frequency; means for selectively engaging either of said reciprocation imparting means whereby, during rotation, reciprocations of either frequency may be imparted to the shaft; and means for selectively rendering the reciprocation imparting means inoperative to permit rotation of the shaft free of reciprocation.

5. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; a first pair of engageable face cams including a face cam axially secured on the shaft and a face cam non-rotatably mounted within the casing coaxial with the shaft to impart to the shaft during rotation reciprocations of one frequency; a second pair of engageable face cams including a face cam axially secured on the shaft and a face cam non-rotatably mounted within the casing coaxial with the shaft to impart to the shaft during rotation reciprocations of another frequency; means for selectively engaging either of the pairs of face cams whereby, during rotation, reciprocations of either frequency may be imparted to the shaft; and means for simultaneously disengaging both pairs of face cams to permit rotation of the shaft free of reciprocation.

6. A drill head for a rotary drill which comprises a casing; a shaft mounted in the casing and capable of simultaneous rotational and reciprocal movement, the shaft being adapted at one end to be rotated by the driving shaft of the rotary drill and at the other end to be connected to a chuck for transmitting thereto rotary and reciprocal movement; a face cam axially secured on the shaft and engageable with a face cam non-rotatably mounted within the casing coaxial with the shaft to impart to the shaft during rotation reciprocations of one frequency; a second face cam axially secured on the shaft and engageable with a second face cam non-rotatably mounted within the casing coaxial with the shaft to impart to the shaft during rotation reciprocations of another frequency, one of said non-rotatable face cams, being slidable by means of a manually operable selector cam connected thereto, to effect the operative engagement of either one of the pairs of face cams while rendering the other pair inoperative; and means including a further manually operable selector cam effective to move the shaft axially thereby simultaneously disengaging both pairs of face cams to permit rotation of the shaft free of reciprocation.

References Cited in the file of this patent

UNITED STATES PATENTS

| 2,223,727 | Homen | Dec. 3, 1940 |
| 2,457,565 | Kott | Dec. 28, 1948 |
| 2,458,929 | Clark | Jan. 11, 1949 |
| 2,630,723 | Gridley | Mar. 10, 1953 |
| 2,794,621 | Beeson | June 4, 1957 |
| 2,869,374 | Morris | Jan. 20, 1959 |